United States Patent [19]

Tarumi et al.

[11] Patent Number: 4,528,351
[45] Date of Patent: Jul. 9, 1985

[54] PLASTIC LENS

[75] Inventors: Niro Tarumi, Akishima; Yoichi Okubo; Seiichi Yoshimoto, both of Fussa, all of Japan

[73] Assignee: Hoya Lens Corporation, Itsukaichjimachi, Japan

[21] Appl. No.: 400,750

[22] Filed: Jul. 22, 1982

[30] Foreign Application Priority Data

Jul. 30, 1981 [JP] Japan ............... 56-119760

[51] Int. Cl.³ ............... C08F 220/20; G03B 1/00
[52] U.S. Cl. ............... 526/314; 204/159.22; 204/159.23; 351/168; 528/503
[58] Field of Search ............... 526/314; 204/159.22, 204/159.23; 528/503; 351/168

[56] References Cited

U.S. PATENT DOCUMENTS

| 2,403,113 | 7/1946 | Muskat et al. | 526/314 |
| 2,445,535 | 7/1948 | Parsons et al. | |
| 3,013,305 | 12/1961 | de Gooreynd | |
| 4,360,653 | 11/1982 | Stevens et al. | 526/314 |

Primary Examiner—Harry Wong, Jr.
Attorney, Agent, or Firm—Bert J. Lewen

[57] ABSTRACT

A plastic lens of a stepped segment having an excellent surface hardness can be obtained at high molding efficiency from cast polymerization of a diethylene glycol bisallyl carbonate and specified acrylate(s) system further added with a specified diacrylate(s) and/or dimethacrylate(s).

3 Claims, No Drawings

PLASTIC LENS

BACKGROUND OF THE INVENTION

This invention relates to a plastic lens having a stepped segment.

The lenses made of organic glass have come into wide use replacing the inorganic glass made lenses in recent years. Organic glass has many advantages over inorganic glass, such as light weight, high stability, good workability and dyeability, and as is well known in the art, diethylene glycol bisallyl carbonate is already widely utilized for the production of organic glass.

However, problems were involved in application of cast polymerization technique to the manufacture of lenses having a stepped segment; according to this technique, stress would concentrate at the stepped segment portion of the lens at the time of polymerization shrinkage, making the lens and mold susceptible to break and thus badly reducing the productivity.

In order to solve these problems, the following methods have been proposed and attempted: a method in which molding is carried out by controlling the degree of polymerization of diethylene glycol bisallyl carbonate and a method in which an excessively longer time is used for the polymerization than in the conventional methods to improve the moldability. However, the former method had the disadvantage that because of its extremely low surface hardness, the product might be splitted at the time of annealing or the product (lens) might prove unable to undergo surface coating, while the latter method had the problems of very poor productivity and liability of the lens to get tinted in yellow.

SUMMARY OF THE INVENTION

The principal object of this invention is to provide a plastic lens of a stepped segment having a high surface hardness, excellent transparency and good moldability.

As a result of extensive studies and researches for attaining the said object, the present inventors found that a plastic lens of a stepped segment with an excellent surface hardness can be obtained at high molding efficiency from cast polymerization of a diethylene glycol bisallyl carbonate and specified acrylate and/or methacrylate system further added with a specified diacrylate and/or dimethacrylate.

Thus, the present invention provides a plastic lens having a stepped segment, said lens being made from a copolymer obtained by copolymerizing diethylene glycol bisallyl carbonate, at least one monomer selected from the group A shown below and at least one monomer selected from the group B shown below, said materials being used in such proportions that the diethylene glycol bisallyl carbonate will be 95 to 50% by weight, the group A monomer will be 5 to 50% by weight and the group B monomer will be 0.1 to 25% by weight, all such percentages being based on the total weight of said diethylene glycol bisallyl carbonate and group A monomer.

Group A: methyl acrylate, ethyl acrylate, cyclohexyl acrylate, glycidyl acrylate, allyl acrylate and their methacrylate versions.

Group B: diethylene glycol diacrylate, triethylene glycol diacrylate, tetraethylene glycol diacrylate and their methacrylate versions.

DETAILED DESCRIPTION OF THE PREFERRED EMBODIMENTS

Diethylene glycol bisallyl carbonate is used in an amount within the range of 95 to 50% by weight for producing the plastic lens according to this invention. If the amount of diethylene glycol bisallyl carbonate used is less than 50% by weight, the lens surface hardness is excessively lowered and the mold becomes easily breakable, while if said amount exceeds 95% by weight, the lens tends to develop splits and cracks and the moldability is badly deteriorated. It is most preferred to use this material in an amount within the range of 90 to 70% by weight.

The group A monomer is used in an amount within the range of 5 to 50% by weight. If the amount of this group A monomer used is less than 5% by weight, splits and cracks are liable to form in the lens and the moldability is greatly reduced. On the other hand, use of said group A monomer in excess of 50% by weight not only results in an intolerably low surface hardness of the lens but also makes the mold vulnerable to breaks or fractures. The most preferred range of the amount of this group A mononer (or monomers) used in this invention is 10 to 30% by weight.

The group B monomer should be used in an amount within the range of 0.1 to 25% by weight based on the total weight of said diethylene glycol bisallyl carbonate and group A monomer. If the amount of this group B monomer exceeds 25% by weight, clouding may be caused in the lens to give rise to the problems in practical use of the lens, while if said amount is less than 0.1% by weight, the lens is liable to develop splits and cracks. The preferred amount range of this group B monomer (or monomers) is 0.5 to 15% by weight.

Such plastic lens having a stepped segment according to this invention can be produced by casting a mixed solution of diethylene glycol bisallyl carbonate, at least one group A monomer, at least one group B monomer and a polymerization initiator into molds assembled from a glass matrix and a resin-made gasket and curing the molding by suitable means such as heating or ultraviolet-light irradiation.

The term "plastic lens having a stepped segment" as used in this invention refers to a variety of practical lenses having a so-called stepped segment, such as flat-top bifocal lens, curved-top bifocal lens, round-top bifocal lens, lenticular lens, full-segment bifocal (Ex) lens, flat-top trifocal lens, curved-top trifocal lens and the like.

Use of the copolymer according to this invention can not only realize very easy production of a plastic lens having a large level difference (step) but also makes it possible to obtain a plastic lens having so high surface hardness, excellent transparency, good glass coatability and good moldability as can never be expected from the hitherto known plastic lenses having a stepped segment.

The present invention is further described hereinbelow by way of the embodiments thereof.

EXAMPLE 1

The mixed solution consisting of 60 parts of diethylene glycol bisallyl carbonate (hereinafter referred to as CR-39), 40 parts of methyl methacrylate, 10 parts of tetraethylene glycol dimethacrylate and 3.2 parts of diisopropyl peroxydicarbonate was cast into the molds made up of a flat-top bifocal lens matrix and a resin-made gasket and heated from 30° to 90° C. for a period of 24 hours. At the time of completion of the polymerization, the lens was completely free of crack and also the lens could be easily released from the glass molds. The thus molded lens was then subjected to one-hour heat treatment at 120° C.

The obtained lens had a refractive index of 1.50, a transmittance of 92% (550 nm) and a pencil scratch hardness of 3H, and it could meet the FDA standards on impact resistance and was possessed of the excellent lnes properties. Also, the coating film formed on the lens by a vacuum evaporation coating method showed excellent adhesion rated as 100/100 in a crosscut test. This lens had the better lens properties than the lenses produced in Comparative Examples 1–5.

EXAMPLE 2

The mixed solution composed of 70 parts of CR-39, 30 parts of ethyl acrylate, 15 parts of diethylene glycol dimethacrylate and 4 parts of diisopropyl peroxydicarbonate was cast into the molds composed of a full-segment bifocal (Ex) lens matrix and a resin-made gasket and heated from 40° to 90° C. for a period of 24 hours. At the time of completion of the polymerization, the lens was perfectly free of split and chip and it could be easily released from the glass molds. The removed lens was then subjected to one-hour heat treatment at 120° C.

The thus obtained lens had a refractive index of 1.50, a transmittance of 92% (550 nm) and a pencil scratch hardness of 2–3H, and it conformed to the FDA standards on impact resistance and showed excellent lens properties. Also, the coating film formed by the vacuum evaporation coating method showed excellent adhesion rated as 100/100 in a crosscut test.

EXAMPLE 3

To the mixed solution of 80 parts of CR-39, 20 parts of cyclohexyl methacrylate and 10 parts of triethylene glycol dimethacrylate was added 5 parts of diisopropyl peroxydicarbonate, and the whole mixed solution, after stirred well, was cast into the molds made up of a lenticular lens matrix and a resin-made gasket and heated from 40° to 90° C. for a polymerization period of 24 hours. At the time of completion of the polymerization, the lens was completely free of split and chip and it could be easily released from the glass molds. Also, the lens developed no crack, etc., when released from the molds. The molded lens was then subjected to one-hour heat treatment at 120° C.

The thus obtained lens had a refractive index of 1.50, a transmittance of 92% (550 nm) and a pencil scratch hardness of 2–3H. This lens could meet the FDA standards on impact resistance and possessed the excellent lens properties. Also, the coating film formed on the lens by the vacuum evaporation coating method showed excellent adhesion rated as 100/100 in a crosscut test.

EXAMPLE 4

To the mixed solution consisting of 100 parts of CR-39, 20 parts of methyl methacrylate and 5 parts of triethylene glycol dimethacrylate was added 4 parts of diisopropyl peroxydicarbonate, and after stirring well, the whole mixed solution was cast into the molds made up of a flat-top trifocal lens matrix and a resin-made gasket and heated from 30° to 90° C. for a polymerization period of 24 hours. At the time of completion of the polymerization, no crack nor chip was seen at both stepped segment portion and its peripehry of the lens, and the lens could be easily released from the glass molds. Also, the lens developed no crack, etc., when released from the molds. The removed lens was subjected to one-hour heat treatment at 120° C.

The obtained lens had a refractive index of 1.50, a transmittance of 92% (550 nm) and a pencil scratch hardness of 3H. It passed the FDA standards on impact resistance and exhibited the excellent lens properties. Also, the coating film formed by the vacuum evaporation coating method showed excellent adhesion rated as 100/100 in a crosscut test.

EXAMPLE 5

To the mixed solution consisting of 100 parts of CR-39, 10 parts of methyl methacrylate, 10 parts of cyclohexyl methacrylate, 10 parts of triethylene glycol dimethacrylate and 10 parts of tetraethylene glycol dimethacrylate was added 3 parts of diisopropyl peroxydicarbonate, and after sufficient stirring, the mixed solution was cast into the molds made up of a curved-top bifocal lens matrix and a resin-made gasket and heated from 30° to 90° C. for a polymerization period of 24 hours. At the time of completion of the polymerization, no crack nor chip flash was present at both stepped segment portion and its periphery of the lens, and the lens could be easily released from the glass molds. Also, no crack, etc., developed in the lens when released from the molds. The removed lens was heat treated at 120° C. for one hour.

The thus obtained lens had a refractive index of 1.50, a transmittance of 92% (550 nm) and a pencil scratch hardness of 3H. This lens passed the FDA standards on impact resistance and had the excellent lens properties. Also, the lens coating film formed by the vacuum evaporation coating method showed excellent adhesion rated as 100/100 in a crosscut test.

COMPARATIVE EXAMPLE 1

The lens was made in the same way as Example 1 except that 100 parts of CR-39 alone was used as monomer component and that the mixed solution cast into the molds was heated from 40° to 60° C.

The obtained lens had a low surface hardness, with its pencil scratch hardness being below F, and showed a refractive index of 1.50 and a transmittance of 92% (550 nm). It was tried to form a coating film on the lens by the vacuum evaporation coating technique, but no desired coating film could be formed.

COMPARATIVE EXAMPLES 2–5

Lenses were made in the same way as Example 1 except for use of 100 parts of CR-39 alone (Comparative Example 2), 40 parts of CR-39, 60 parts of methyl methacrylate and 20 parts of diethylene glycol dimethacrylate (Comparative Example 3), 30 parts of CR-39, 70 parts of ethyl acrylate and 30 parts of triethylene glycol dimethacrylate (Comparative Example 4), and 20 parts of CR-39, 80 parts of cyclohexyl methacrylate and 40 parts of tetraethylene glycol dimethacrylate (Comparative Example 5) as monomer component.

The properties of the resultantly obtained lenses are shown in Table 1 together with the properties of the lenses obtained in Examples 1–5 and Comparative Example 1.

TABLE 1

| | Monomer composition | | | | | | | Lens properties | | | | |
|---|---|---|---|---|---|---|---|---|---|---|---|---|
| | CR-39 | MMA | EA | CyHMA | 2EDMA | 3EDMA | 4EDMA | Transmittance (%) | Refractive index | Pencil scratch hardness | Coatability | Cracks |
| Example 1 | 60 | 40 | | | | | 10 | 92 | 1.50 | 3H | O | None |
| 2 | 70 | | 30 | | 15 | | 10 | 92 | 1.50 | 2-3H | O | None |
| 3 | 80 | | | 20 | | 10 | | 92 | 1.50 | 2-3H | O | None |
| 4 | 100 | 20 | | | | 5 | | 92 | 1.50 | 3H | O | None |
| 5 | 100 | 10 | | 10 | | 10 | 10 | 92 | 1.50 | 3H | O | None |
| Comparative Example 1 | 100 | | | | | | | 92 | 1.50 | below F | X | Many |
| 2 | 100 | | | | | | | 92 | 1.50 | H-2H | O | Many |
| 3 | 40 | 60 | | | 20 | | | 91 | 1.50 | below F | X | None |
| 4 | 30 | | 70 | | | 30 | | 91 | 1.50 | below F | X | Many |
| 5 | 20 | | | 80 | | | 40 | 91 | 1.50 | below F | X | Many |

Notes
CR-39: diethylene glycol bisallyl carbonate
MMA: methyl methacrylate
EA: ethyl acrylate
CyHMA: cyclohexyl methacrylate
2EDMA: diethylene glycol dimethacrylate
3EDMA: triethylene glycol dimethacrylate
4EDMA: tetraethylene glycol dimethacrylate
Transmittance: measured by Hitachi's autographic spectrophotometer (at 550 nm).
Pencil scratch hardness: measured according to the general paint testing method JIS-K-5400.
Refractive index: measured by Abbe's refractometer manufactured by Atago Co., Ltd.
Coatability: judged by a crosscut test on the coating film formed by the vacuum evaporation coating method.
O mark: acceptable
X mark: unacceptable
Cracks: judged by the naked-eye observation.

What is claimed is:

1. A plastic lens having a stepped segment composed of a copolymer obtained by copolymerizing diethylene glycol bisallyl carbonate, at least one monomer selected from the group A shown below and at least one monomer selected from the group B shown below, said materials being used in such proportions that diethylene glycol bisallyl carbonate will be 95–50% by weight, the group A monomer will be 5–50% by weight based on the total weight of the diethylene glycol bisallyl carbonate and Group A monomer and the group B monomer will be 0.1–25% by weight based on the total weight of said diethylene glycol bisallyl carbonate and group A monomer, Group A: methyl acrylate, ethyl acrylate, cyclohexyl acrylate, glycidyl acrylate, allyl acrylate or their methacrylate versions, Group B: diethylene glycol diacrylate, triethylene glycol diacrylate, tetraethylene glycol diacrylate or their methacrylate versions.

2. The plastic lens of claim 1, wherein the group A monomer is selected from the group consisting of methyl methacrylate, ethyl acrylate and cyclohexyl methacrylate, and the group B monomer is selected from the group consisting of diethylene glycol dimethacrylate, triethylene glycol dimethacrylate and tetraethylene glycol dimethacrylate.

3. The plastic lens of claim 1, wherein diethylene glycol bisallyl carbonate is used in an amount of 90 to 70% by weight, the group A monomer in an amount of 10 to 30% by weight based on the total weight of the diethylene glycol bisallyl carbonate and Group A monomer and the group B monomer in an amount of 0.5 to 15% by weight based on the total weight of said diethylene glycol bisallyl carbonate and group A monomer.

* * * * *